H. N. McCOY.
PROCESS FOR TREATING SO-CALLED CARNOTITE AND ASSOCIATED AND SIMILAR VANADIUM AND URANIUM MINERALS.
APPLICATION FILED MAR. 16, 1914.

1,098,282. Patented May 26, 1914.

a — — — — — Ore subdivision.

b — — — — Mixture with Sulfuric Acid.

c — — — — Heating to approximately 100° C.

d — — — — Further heating to approximately 300° C.

e — — — — — Leaching with water.

Solution of sulfates Vanadium, Uranium, Iron, etc.
Recovery — Vanadium + Uranium.

Sand containing insoluble sulfates of Radium + Barium
Recovery of Radium.

Witnesses
N. P. Leonard.
E. C. Tate.

Inventor
Herbert N. McCoy
By Byrnes Townsend + Brickenstein
Attorneys

UNITED STATES PATENT OFFICE.

HERBERT N. McCOY, OF CHICAGO, ILLINOIS.

PROCESS FOR TREATING SO-CALLED CARNOTITE AND ASSOCIATED AND SIMILAR VANADIUM AND URANIUM MINERALS.

1,098,282.  Specification of Letters Patent.  Patented May 26, 1914.

Application filed March 16, 1914. Serial No. 825,165.

*To all whom it may concern:*

Be it known that I, HERBERT N. MCCOY, a citizen of the United States, residing at Chicago, in the county of Cook and State of Illinois, have invented certain new and useful Improvements in Processes for Treating So-Called Carnotite and Associated and Similar Vanadium and Uranium Minerals, of which the following is a specification.

This invention relates to processes of treating so-called carnotite, and associated or allied minerals, including such as contain radium.

A primary object of the invention is to effect a substantially complete decomposition of minerals of the above type, with production of a mass in which substantially all of the vanadium and uranium are contained in a readily soluble state.

The term "ore" is herein used to include the natural ores as well as concentrates therefrom.

An illustrative example of my process is as stated below, the material treated being a carnotite concentrate containing approximately 11.9 per cent. of $V_2O_5$, 5.6 per cent. of $U_3O_8$, and 4.4 per cent. of $Fe_2O_3$, together with barium and some radium, and about 50 per cent. of $SiO_2$. Ores of this type do not yield the whole of their vanadium content, even by prolonged boiling (ten to twelve hours) with dilute sulfuric acid. I have found however that complete decomposition of such ores is secured by the following process.

The accompanying drawing illustrates my process diagrammatically.

The concentrate is suitably subdivided, and is mixed to a paste with sufficient sulfuric acid for the conversion into sulfates of all bases which may be present. The sulfuric acid employed may be either concentrated or dilute. The acid paste is heated gently until a temperature approximating 100° C. is reached, and then more strongly to an ultimate temperature of 300° C., or even higher if found desirable. By this treatment, the bases are converted into sulfates with substantial completeness, and the mass assumes the form of a solid cake of greenish color. This mass is treated with hot or cold water, whereby the soluble sulfates are removed. The insoluble residue, when dry, appears as a light-gray powder consisting largely of sand with small proportions of insoluble sulfates, including barium and radium, but substantially free from vanadium, uranium and iron. From this insoluble residue, the salts or compounds of radium may be recovered or concentrated by any known or approved methods, for example, those described by Mme. Curie, *Thèses Présentée à la Faculté des Sciences de Paris*, 1903, and by Haitinger & Ulrich, Wien, *Ber.* 117, p. 619, 1908, the treatment being materially simplified by the absence of vanadium, uranium and iron.

The green aqueous solution obtained as above is worked up in accordance with any desired or appropriate method for the recovery of its values. For example the solution, which may contain some free sulfuric acid, is neutralized with soda or otherwise as far as is possible without causing precipitation. It is then oxidized by potassium chlorate, chlorin, or other appropriate oxidizing agent, diluted if necessary, and boiled. The oxidization causes the color of the solution to change from green to brown, the vanadium being left in the pentavalent state and the iron in the ferric state. The oxidized solution, upon boiling, gives a yellow to brown precipitate consisting largely or exclusively of compounds of vanadium and iron, possibly a basic ferric vanadium mixed with some vanadium pentoxid.

When the acidity and concentration are properly adjusted, the separation of vanadium and iron from the solution is practically complete. The filtrate from the vanadium-iron precipitate contains all of the uranium, together with sulfates of other bases. From this solution, the uranium may readily be separated by known methods.

I have observed, in treating certain very pure grades of carnotite according to the method above described, that the mass obtained is as a result of the sulfuric-acid treatment is brown in color and is difficultly or imperfectly soluble in water. The brown color of the mass indicates the presence of the vanadium in its pentavalent and less soluble state. In such cases, I have found that the difficulty may be remedied by adding to the ore-sulfuric-acid mixture a small proportion of an appropriate reducing agent, preferably a carbonaceous material such as soft coal or charcoal, the reaction then yielding the desired readily soluble, solid sulfate. It may, therefore, be assumed that such commercial concentrates as require no added reducing agent already contain reducing substances, possibly of the humus type. Hence, where reference is made in the claims to the treatment of the ore "in presence of sulfuric acid", it is to be understood that I refer both to the treatment of concentrates which yield directly a readily soluble, solid product, and to the treatment of such minerals or concentrates as may require an added reducing agent to yield such products.

I claim:—

1. A process of treating carnotite and allied ores, consisting in heating the ore in presence of sulfuric acid until a mass is obtained which is solid when cold and which contains substantially all of the vanadium and uranium in a readily soluble condition, extracting the soluble constituents from the said mass, treating the solution thus obtained to recover the values therefrom, and treating the residue for the concentration of its radium content.

2. The process of treating carnotite and allied ores, consisting in heating the ore in presence of sulfuric acid to a final temperature approximating 300° C., thereby obtaining a mass which contains substantially all of the vanadium and uranium in a readily soluble condition, extracting the soluble constituents from the said mass, treating the solution thus obtained to recover the values therefrom, and treating the residue for the concentration of its radium content.

3. In a process of treating carnotite and allied ores, the step which consists in heating the ore in presence of sulfuric acid until a mass is obtained which is solid when cold and which contains the vanadium and uranium content of the ore in a readily soluble condition.

4. In a process of treating carnotite and allied ores, the step which consists in heating the ore in presence of sulfuric acid to a temperature approximating 300° C. until a mass is obtained which is solid when cold and which contains the vanadium and uranium content of the ore in a readily soluble condition.

5. The process of treating carnotite and allied ores, consisting in heating the ore in the presence of sulfuric acid to a final temperature approximating 300° C., thereby obtaining a mass which contains substantially all of the vanadium and uranium in a readily soluble condition.

In testimony whereof I affix my signature in presence of two witnesses.

HERBERT N. McCOY.

Witnesses:
EDWIN D. LEMAN.
VORIES G. McCOY.